(12) United States Patent
Palli et al.

(10) Patent No.: US 11,972,018 B2
(45) Date of Patent: Apr. 30, 2024

(54) DATA CATEGORIES FOR PURPOSE-BASED PROCESSING OF PERSONAL DATA

(71) Applicant: SAP SE, Walldorf (DE)

(72) Inventors: Saritha Palli, Bangalore (IN); Naved Ahmed, Bangalore (IN)

(73) Assignee: SAP SE, Walldorf (DE)

( * ) Notice: Subject to any disclaimer, the term of this patent is extended or adjusted under 35 U.S.C. 154(b) by 301 days.

(21) Appl. No.: 17/582,650

(22) Filed: Jan. 24, 2022

(65) Prior Publication Data

US 2023/0237189 A1 Jul. 27, 2023

(51) Int. Cl.
*G06F 21/62* (2013.01)
*G06F 16/28* (2019.01)

(52) U.S. Cl.
CPC ........ *G06F 21/6245* (2013.01); *G06F 16/285* (2019.01)

(58) Field of Classification Search
CPC .......................... G06F 21/6245; G06F 16/285
See application file for complete search history.

(56) References Cited

U.S. PATENT DOCUMENTS

| 8,856,075 | B2* | 10/2014 | Rathod | H04L 51/52 |
| | | | | 707/769 |
| 11,551,803 | B1* | 1/2023 | Arazi | G06Q 30/0631 |
| 2020/0012814 | A1* | 1/2020 | Brannon | G06F 21/6245 |

* cited by examiner

*Primary Examiner* — Sm A Rahman
(74) *Attorney, Agent, or Firm* — SCHWEGMAN LUNDBERG & WOESSNER, P.A.

(57) ABSTRACT

Computer-readable media, methods, and systems are provided for purpose-based processing of personal data within an information retrieval framework. A data subject may request information relating to their personal data such that the data subject is identified within the information retrieval framework and an information report is generated based on the personal data of the data subject and its purpose assignment and data category assignment. The information report is provided to the data subject such that the data subject may review how their personal data is processed and organized within the information retrieval framework.

20 Claims, 7 Drawing Sheets

DATA CATEGORIES FOR PURPOSE-BASED PROCESSING OF PERSONAL DATA

BACKGROUND

Typical data storage and data management systems do not provide a data subject with any feedback as to how their personal data is being processed and categorized. Further, said data storage and management systems provide no way to manage access to personal data based on an assigned purpose for processing the personal data. Accordingly, data subjects cannot confirm that their personal data is being protected properly and processed for the correct reasons by a data controller.

SUMMARY

Embodiments solve the above-mentioned problems by providing systems, methods, and computer-readable media for purpose-based processing of personal data within an information retrieval framework. A data subject may request information relating to their personal data such that the data subject is identified within the information retrieval framework and an information report is generated based on the personal data of the data subject and its purpose assignment and data category assignment. The information report is provided to the data subject such that the data subject may review how their personal data is processed and organized within the information retrieval framework.

Some embodiments are directed to computer-readable media, methods, and systems for purpose-based processing of personal data, the method comprising providing a plurality of purpose assignments and a plurality of data categories within an information retrieval framework, each purpose of the plurality of purpose assignments defining access to personal data, each set of personal data belonging to a respective data subject of a plurality of data subjects, each data category of the plurality of data categories defining a grouping of personal data, assigning a purpose of the plurality of purpose assignments to a set of personal data belonging to a data subject of the plurality of data subject, assigning a data category of the plurality of data categories to the set of personal data, receiving a request from the data subject to review a set of personal data of the data subject, in response to the request from the data subject, identifying the data subject within the information retrieval framework using at least one user identifier associated with the data subject, retrieving a set of information from the information retrieval framework indicative of the assigned purpose and the assigned data category corresponding to the set of personal data, generating an information report based on the retrieved information, and providing the information report to the data subject for reviewing the assigned purpose and the assigned data category of the set of personal data.

Additional embodiments are directed to a method for managing access to a set of personal data based on an assigned data category and an assigned purpose. Here, the method may comprise receiving, from a data controller, a request to access the set of personal data associated with the information retrieval framework, determining whether the data controller is allowed to access the set of personal data based on an assigned purpose of the plurality of purpose assignments associated with the set of personal data, in response to determining that the data controller is allowed to access the set of personal data, retrieving the set of personal data according to the assigned purpose, and providing access to the data controller to process the set of personal data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
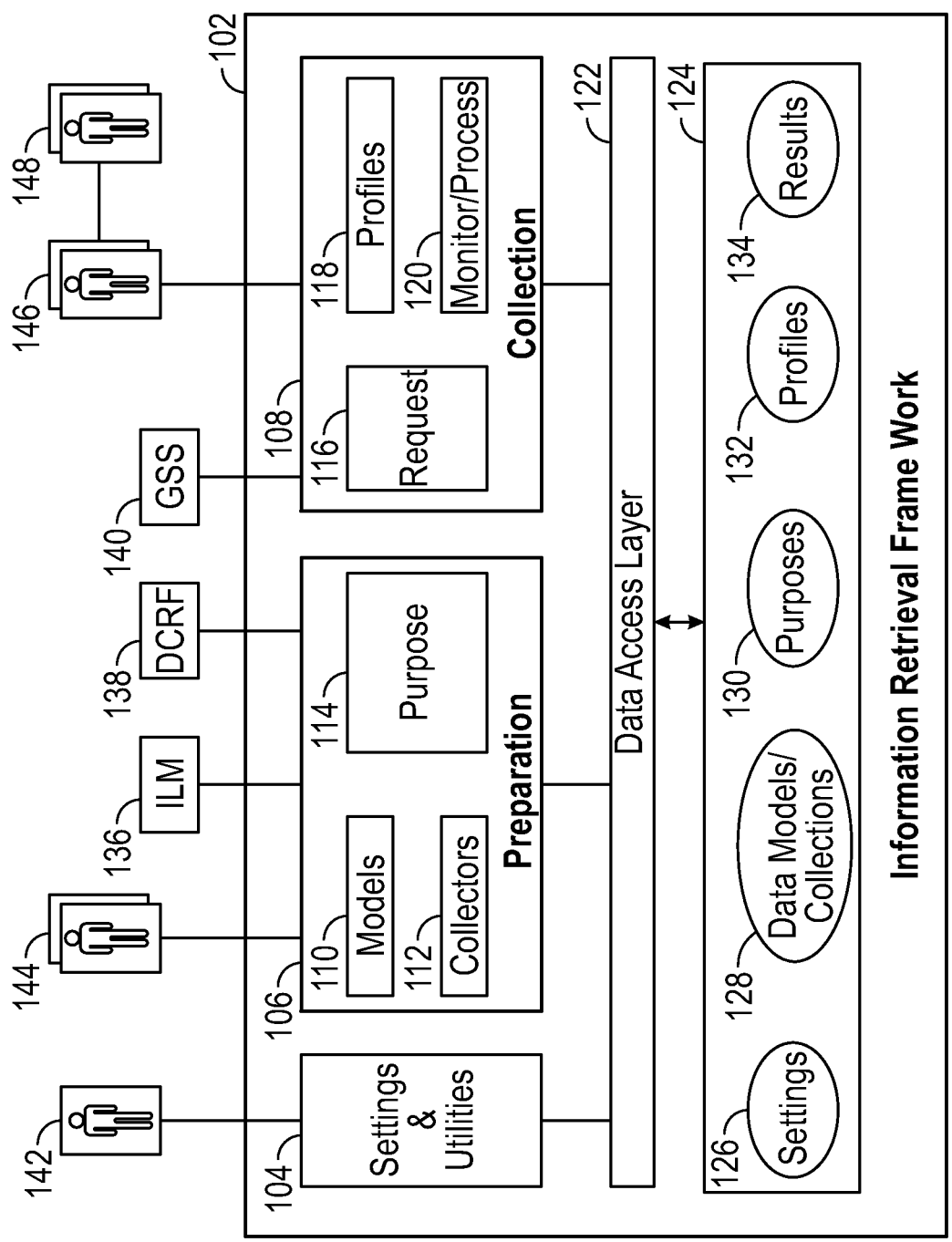
FIG. 1 depicts an exemplary system diagram of an information retrieval framework relating to some embodiments.

The drawing figures do not limit the disclosure to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the disclosure in sufficient detail to enable those skilled in the art to practice the present teachings. Other embodiments can be utilized and changes can be made without departing from the scope of the disclosure. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Turning first to FIG. 1, an exemplary system diagram of a system 100 is depicted relating to some embodiments. In some embodiments, the system 100 comprises an information retrieval framework 102. In some such embodiments, the information retrieval framework 102 comprises a settings and utilities portion 104, a preparation portion 106, and a collection portion 108. Here, the settings and utilities portion 104 may be operated to adjust or review various settings of the information retrieval framework 102. In some embodiments, the preparation portion 106 includes a models component 110, a collectors component 112, and a purpose component 114. The models component 110 comprises various features which may be used to adjust a model, for example, including a generate feature for generating a model, an adjustment feature for adjusting a model, a view feature for viewing a model, and a validation feature for validating a model. In some embodiments, the purpose component 114 comprises a create feature for creating a new purpose, an assignment feature for assigning a purpose, and a filter feature for assigning filters for a purpose.

In some embodiments, the collection portion 108 comprises a request component 116, a profiles component 118, and a monitor/process component 120. Here, the monitor/process component 120 may include a display feature for displaying information relating to the information retrieval framework 102, a personalization feature for personalizing various parameters of the information retrieval framework 102, and a download feature for downloading information from the information retrieval framework 102. In some embodiments, the information retrieval framework 102 further comprises a data access layer 122, as shown, which may be communicatively coupled to each of the settings and utilities portion 104, the preparation portion 106, and the collection portion 108.

In some embodiments, at least one data store 124 may be included on or accessible to the information retrieval framework 102. For example, in some embodiments, data including settings data 126, data models/collectors data 128, purpose data 130, profile data 132, and results data 134 may be stored on one or more data stores 124 and may be accessed through the data access layer 122, as shown. In some embodiments, the data described herein may be separated across a plurality of distinct data stores, any of which may be either included as part of the information retrieval framework or included externally. Further, in some embodiments, the data access layer 122 and the data store 124 may be remote from other components of the information retrieval framework 102. For example, in some embodiments, the information retrieval framework 102 may interface with a cloud-based system such as a cloud-based data system. Accordingly, embodiments are contemplated in which the information retrieval framework 102 may interface with one or more remote cloud-based servers.

In some embodiments, one or more external components may be included within the system 100. For example, in some embodiments, an information lifecycle management component 136, a data controller rule framework 138, and a generic smart search component 140 may be included, as shown, each of which may be communicatively coupled to the information retrieval framework 102. In some such embodiments, the generic smart search component 140 is a searching tool used to search for information within the information retrieval framework 102, for example using a search query structure. In some embodiments, the information lifecycle management component 136 may interface with to the preparation portion 106 of the information retrieval framework 102, while the data controller rule framework 138 may interface with the purpose component 114 of the preparation portion 106, and the generic smart search component 140 may interface with the collection portion 108 of the information retrieval framework 102.

In some embodiments, one or more users or other entities may be associated with the information retrieval framework 102. For example, in some embodiments, an administrator 142 may be included and may interface with the settings and utilities portion 104 of the information retrieval framework 102. Further, one or more modelers 144 may be included which interface with the preparation portion 104 of the information retrieval framework 102. Further still, one or more data protection and privacy officers 146 may be included which interface with the collection portion 108 of the information retrieval framework 102. In some embodiments, one or more data subjects 148 may be included and may interface with the data protection and privacy officer 146, as shown. Accordingly, embodiments are contemplated in which implementing purpose-based processing protects the privacy of personal data associated with one or more data subjects. Here, purposes may be assigned to sets of personal data within the information retrieval framework 102 which define access to said sets of personal data.

In some embodiments, each of the administrator 142, the modeler 144, the data protection and privacy officer 146, and the data subject 148 may be single users. Alternatively, embodiments are contemplated in which any of the administrator 142, the modeler 144, the data protection and privacy officer 146, and the data subject 148 represent groups of users or entities. In some embodiments, the roles of at least one of the users 144, 146, or 148 or administrator 142 may be at least partially automated. For example, in some embodiments, the role of the data protection and privacy officer 146 may be automated such that a processor is configured to perform the operations on electronic data of the data protection and privacy officer 146, as described herein.

In some embodiments, the purpose component 114 may be added to an existing information retrieval framework 102. Accordingly, embodiments are contemplated in which various purpose-based and data category features are integrated into a system which is already established. For example, a preexisting information retrieval framework may be used by a plurality of users and entities and then be upgraded to include various purpose-based and data category features to incorporate purpose-based processing to enhance the privacy and protection of data subjects associated with the information retrieval framework 102. Alternatively, in some embodiments, the purpose-based and data category features are present within a new system.

Figure 2:
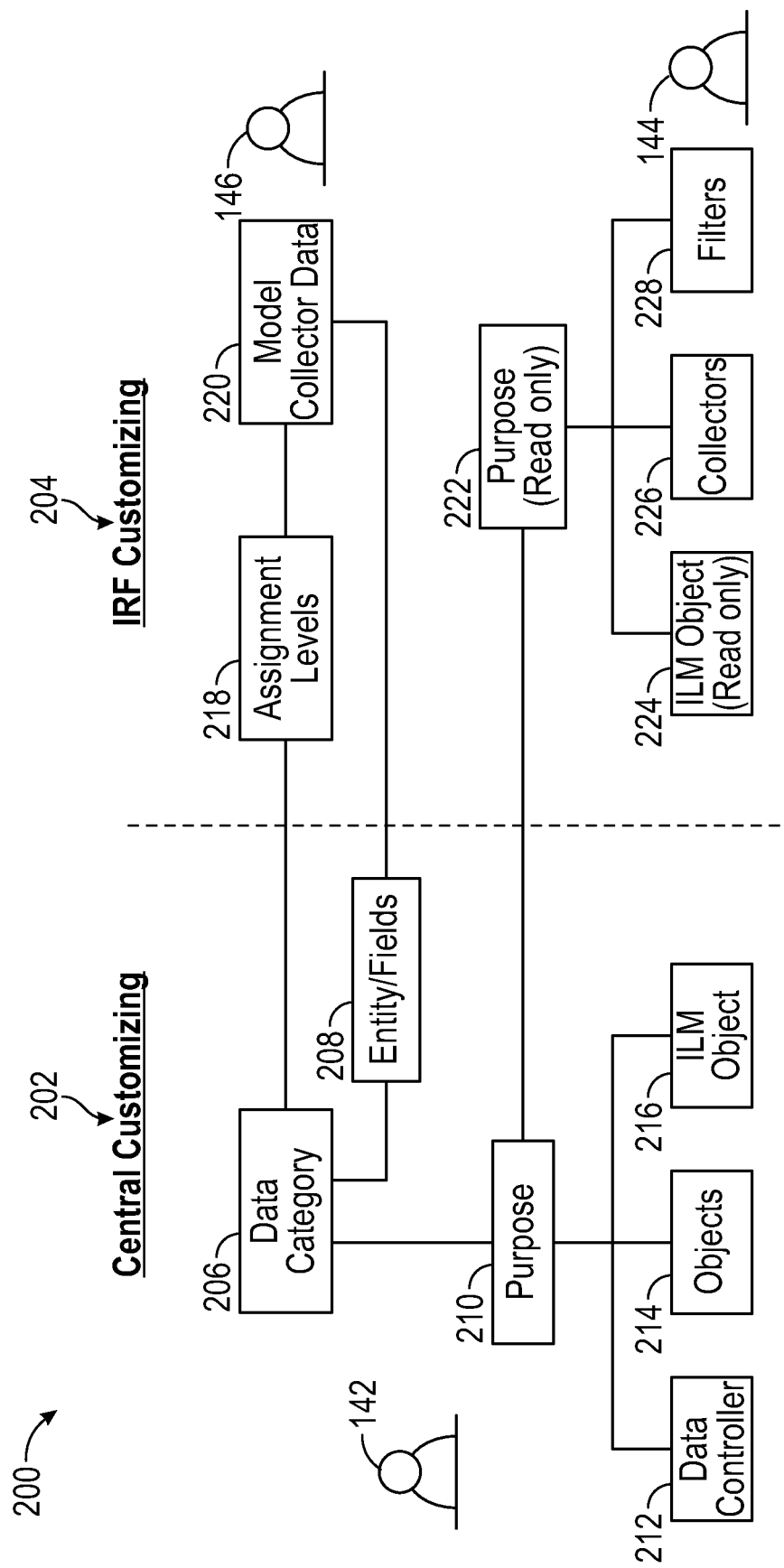
FIG. 2 depicts an exemplary system diagram of data assignments relating to some embodiments.

Turning now to FIG. 2, an exemplary system diagram of a system 200 for providing purpose-based processing and data categories within the information retrieval framework 102 is depicted relating to some embodiments. In some embodiments, the system 200 comprises a central customizing portion 202 and an information retrieval framework customizing portion 204, as shown. Here, the central customizing portion 202 may comprise a data category 206. In some embodiments, the data category 206 may be one of a plurality of data categories defined within the central customizing portion 202. Accordingly, the data category 206 may be mapped to an entity 208 or a field associated with an entity 208. For example, in some embodiments, the data category 206 may be mapped to one or more data fields within a spreadsheet or data table. Further, embodiments are contemplated in which the data category 206 may be mapped to a field of data corresponding to a plurality of entities.

In some embodiments, the data category 206 may be mapped to a purpose 210, or vice versa. For example, the purpose 210 may be assigned to the data category 206 for defining a purpose for accessing a set of data associated with the data category 206. Here, the purpose 210 is associated with a reason for processing a set of data. In some embodiments, the purpose 210 may define at least one data controller 212 which should have access to the associated set of data. In some embodiments, the set of data may include one or more data objects 214 and one or more information lifecycle management objects 216. Accordingly, in some embodiments, the data category 206 controls a processing behavior of an associated set of data. For example, in some embodiments, access to the data object 214 by the data controller 212 may be determined based on the data category 206 and purpose 210. In some embodiments, the information lifecycle objects 216 comprise data objects with an associated retention period defining a period of time for which the data objects are stored. Accordingly, in some embodiments, the lifecycle objects 216 may be deleted after the retention period expires.

In some embodiments, the data category 206 may be mapped to one or more levels 218 within the information retrieval framework 102. In some embodiments, the data category 206 may be mapped to groups of data tables or groups of data fields. In some embodiments, a set of model data 220 may be included associated with one or more data tables and data fields. In some embodiments, the model data 220 includes data tables and fields corresponding to the entity 208. In some embodiments, a read-only purpose 222 may be included within the information retrieval framework customizing portion 204, as shown. Said read-only purpose 222 may be a read-only copy of the purpose 210. Accordingly, the read-only purpose 222 may not be edited or adjusted within the information retrieval framework 102. In some embodiments, the read-only purpose 222 is mapped to one or more read-only information lifecycle management data objects 224, as shown. The read-only information lifecycle management data objects 224 may correspond to the information lifecycle management data object 216. In some embodiments, the read-only purpose 222 is further associated with a set of collector data 226 and one or more filters 228.

In some embodiments, the administrator 142 may operate the central customization portion 202, as shown. Accordingly, the administrator 142 may assign the data category 206 and purpose 210. Further, in some embodiments, the data protection and privacy officer 146 may view or edit the model data 220 and the information retrieval framework modeler 144 may view or edit the collector data 226 and filters 228 of the information retrieval framework customization portion 204.

Figure 3:
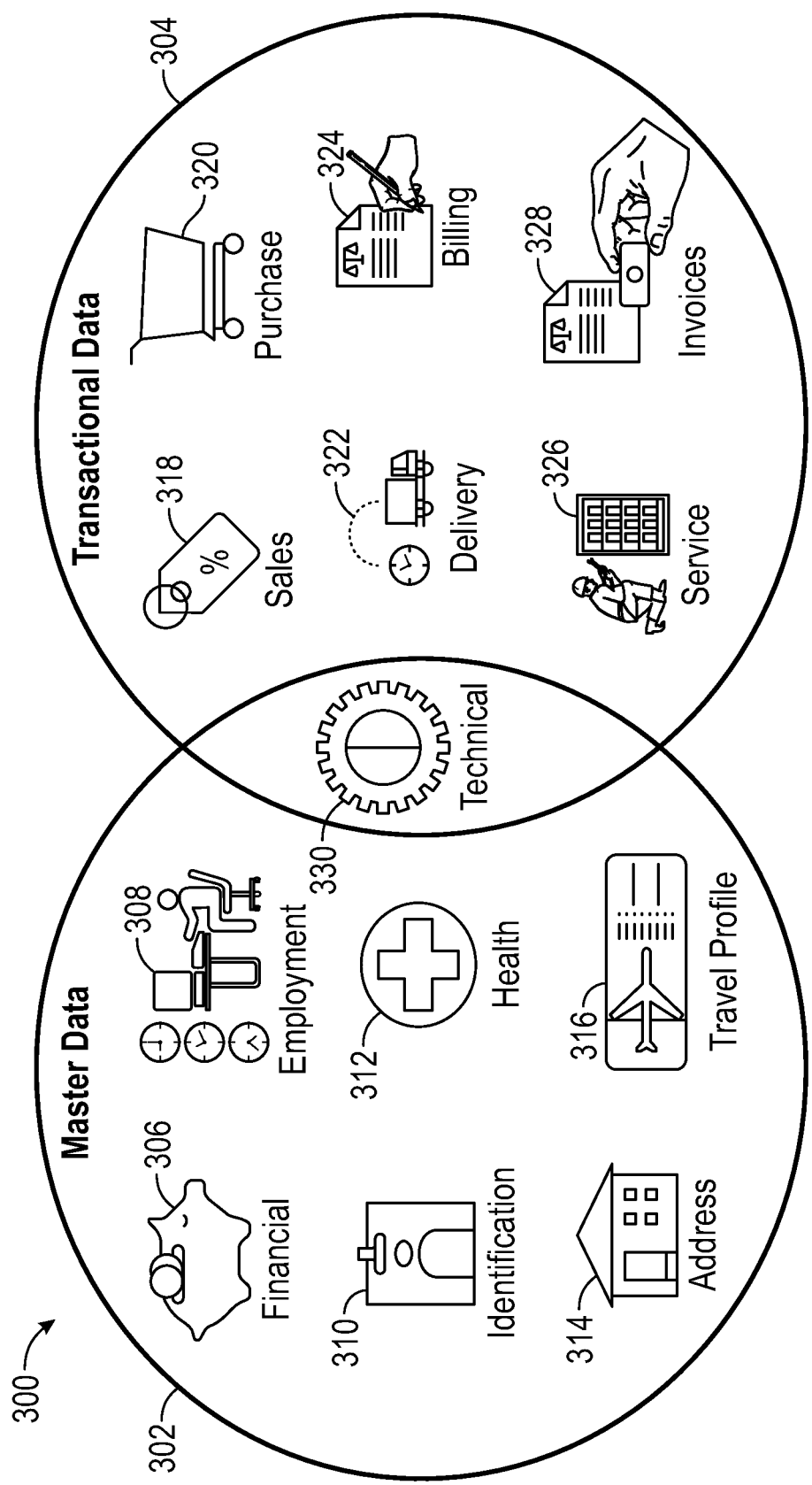
FIG. 3 depicts an exemplary Venn diagram of data categories relating to some embodiments.

Turning now to FIG. 3, a Venn diagram 300 including a set of exemplary data categories is depicted relating to some embodiments. In some embodiments, a variety of different types of data categories are included such as data categories relating to master data 302 and data categories relating to transactional data 304, as shown. Further, in some embodiments, data categories may be included which relate to both master data 302 and transactional data 304. In some embodiments, the master data categories 302 include a financial data category 306, an employment data category 308, an identification data category 310, a health data category 312, an address data category 314, and a travel profile data category 316. In some embodiments, the transaction data categories 304 may include a sales data category 318, a purchase data category 320, a delivery data category 322, a billing data category 324, a service data category 326, and an invoice data category 328. In some embodiments, a technical data category 330 may be included which relates to both master data 302 and transactional data 304.

In some embodiments, various other types of data categories are contemplated. Further, in some embodiments, a number of preconfigured data categories may be included. Additionally, in some embodiments, custom user-defined data categories are also contemplated such that users or administrators are able to define new data categories. In some embodiments, a lifecycle of a set of personal data may be determined based at least in part on the assigned data category. In some embodiments, the determined lifecycle defines a retention period for the set of personal data. Accordingly, the personal data may be deleted after the retention period has expired. For example, a lifecycle may define a retention period of one year after the data is initially stored. Accordingly, the data may be deleted after one year to free up space and ensure that the data subject's privacy is protected.

TABLE 1

| DC Name | Entity | Field | Type | Value (String) |
| --- | --- | --- | --- | --- |
| IDENT | BUT000 | PARTNER | DIRECT | |
| IDENT | BUT0ID | IDNUMBER | DERIVED | BUT0ID-TYPE = 'SSNO' |
| ADDRESS | BUT021 | ADDRNUMBER | DERIVED | BUT021 ADDR_KIND = 'HOME' |
| ADDRESS | BUT021 | ADDRNUMBER | DERIVED | BUT021 ADDR_KIND = 'OFFICE' |
| TEST | TEST1 | TEST2 | API | API NAME (non-CE only) |

Table 1, shown above, is an exemplary data category assignment table relating to some embodiments. In some embodiments, the data category assignment table includes one or more columns mapping a data category to a variety of other data objects. In some embodiments, the data category assignments table includes any combination of a data category column, an entity column, a field column, a type column, and a value column, as shown. In some embodiments, the data category column may include an indication of which data category has been assigned to a given set of data. For example, the data category for the first data entry may be an identification data category, as shown, indicated by the data category column.

In some embodiments, the entity column includes an indication of an entity associated with the set of data. Further, in some embodiments, the field column indicates a specific field of the set of data. For example, in some embodiments, the field column includes a field indicator identifying the set of data within a table of data. For example, a specific set of personal data may be included within a table including a plurality of data sets. In some embodiments, the type column may indicate the type of data category assignment. For example, in some embodiments, data category assignments may be directly assigned, assigned based on a derivation, or assigned using an Application Programming Interface (API). In some embodiments, direct data category assignments may be defined during a customization stage. For example, in some embodiments, direct assignments are predefined as part of the initial data categorization implementation. In some embodiments, derived assignments are based at least in part on one or more values. For example, a derived data category may be designed based on one or more parameters of a data object at run-time. In some embodiments, API assignments may be custom assignments provided through external APIs for handling complex data category assignments.

In some embodiments, the value column may include a specific value or an identifier for a specific value associated with the data object. For example, in some embodiments, the value column may include a string which may be used to identify the data object itself. In some embodiments, the exemplary data category assignment table may be stored as metadata of a data object. Alternatively, in some embodiments, data categories may be stored separately and linked to data objects indirectly. For example, in some embodiments, one or more data category assignment data stores may be included for storing data category assignments. Accordingly, the data category assignments may include one or more identifiers for identifying corresponding data objects. In some embodiments, certain columns may be omitted for specific data category assignments, as shown in Table 1. For example, in some embodiments, a value column may be left blank for a given data category assignment.

In some embodiments, each data category is associated with a sensitivity level which indicates a level of sensitivity of the corresponding set of personal data. For example, in some embodiments, a data category assigned to sensitive personal data such as a social security number may have a high sensitivity level indicating that the data category includes particularly sensitive data. Further, a data category which includes less sensitive data such as a telephone number may have a low sensitivity level indicating that the data in not particularly sensitive. In some such embodiments, additional restrictions may be associated with retrieving personal data from a high sensitivity level data category. For example, said highly sensitive data may be encrypted or protected using another secure data protection technique.

In some embodiments, the purpose assignments may include custom user-defined purpose assignments. For example, in some embodiments, the administrator 142 or the modeler 144 may define one or more custom purposes to be used within the information retrieval framework 102. In some embodiments, a plurality of purposes may be included such as a recruit to retire purpose, a lead to cash purpose, a source to pay purpose, and a design to operate purpose. Here, the recruit to retire purpose may be assigned to personal data and data categories which relate to an employment relationship. For example, the recruit to retire purpose may be established to provide processing access to an employer for using personal data of an employee.

The lead to cash purpose may be assigned to personal data for carrying out a transaction or payment between a data subject and a data controller. For example, a data subject may provide their bank account information to pay or receive payment from a data controller organization. In some embodiments, the source to pay purpose may be assigned to data relating to a sequence of transactions or payments. For example, the source to pay purpose may be assigned to a transaction history from a source to an end purchase. Further, the design to operate purpose may be assigned to data relating to a design project including all information for the design project and its implementation. In some embodiments, a variety of other purposes may be included. Additionally, new user-defined purposes may be added such that the purpose assignments may be adapted for various different types of applications.

In some embodiments, one or more data categories may be assigned to a given purpose such that the purpose definition may include an indication of which data categories are relevant. Accordingly, personal data within any of the relevant data categories as indicated within the purpose definition may be processed for that purpose. In some embodiments, data categories which are not assigned to any purpose may have no impact within the information retrieval framework 102. For example, the lead to cash purpose may be mapped to a set of data categories including an identification data category, an address data category, a finance data category, a sales data category, a billing data category, a delivery data category, and an invoice data category. Accordingly, personal data within any of the listed data categories may be processed for the lead to cash purpose.

In some embodiments, data categories may be maintained for entities or fields of entities. For example, an entity can include any of a table, field group, view, or object. In some embodiments, a free text input may be used to provide the entity. In some embodiments, as described above, the assignment of entities can be static and directly assigned to data categories, or instance-based such that the entity is assigned to the data categories using a derivation or via API. In some embodiments, a single data category may be assigned to multiple entities or multiple fields of entities. For example, in some embodiments, an entity (or field) may be assigned to only one direct data category. Additionally, the entity (or field) may be assigned to a plurality of derived or API-based data categories. In such derivation cases, the assignments may be derived from either of specific matches or generic matches.

In some embodiments, a derived or API assignment of a data category may be determined based at least in part on conditional values which are received during runtime. For example, a customizing framework associated with the information retrieval framework 102 may determine a correct match for a data category and entity or field of an entity based on one or more received user inputs which are received during runtime of the application. Further, in some embodiments, multiple conditions are maintained for a data category using a condition sequence. For example, a condition sequence may be stored for each data category which includes one or more conditions. In some embodiments, multiple conditions may be maintained for a derived data category, entity and/or field combination. In such cases, the operator is derived based on the condition, entities, and fields maintained. Here, the OR operator is derived if there are many conditions with same entity and/or field with different values. Further, the AND operator is derived if there are many conditions with different entity and/or field with values. A complex derivation is also possible, which may comprise both an AND and an OR operator.

In some embodiments, the inputs received from the application at runtime include the entity, the field of the entity (if necessary), and a condition sequence comprising one or more conditions (if necessary), as described above. Accordingly, it is determined whether the entity and field are present in the data category assignment. If the entity/field is present and the data category type is direct, the data category can be directly assigned, and the data category name will be returned. Alternatively, if the entity/field is present and the data category type is derived, the data category name will be returned when the condition matches. In some embodiments, where a plurality of conditions is included, all of the conditions must match before the data category name is returned. In some embodiments, for example, where an OR operator is used, the data category name will be returned if a portion of the conditions are satisfied. If the entity/field is present and the data category type is API, a call may be transmitted to the API module with the received runtime inputs provided by the application. Here, the data category name may be returned if the API returns a true value. Alternatively, in some embodiments, the API returns a specific data category name based on the inputs. In some embodiments, multiple matches may be returned, and multiple data categories are assigned.

Figure 4:
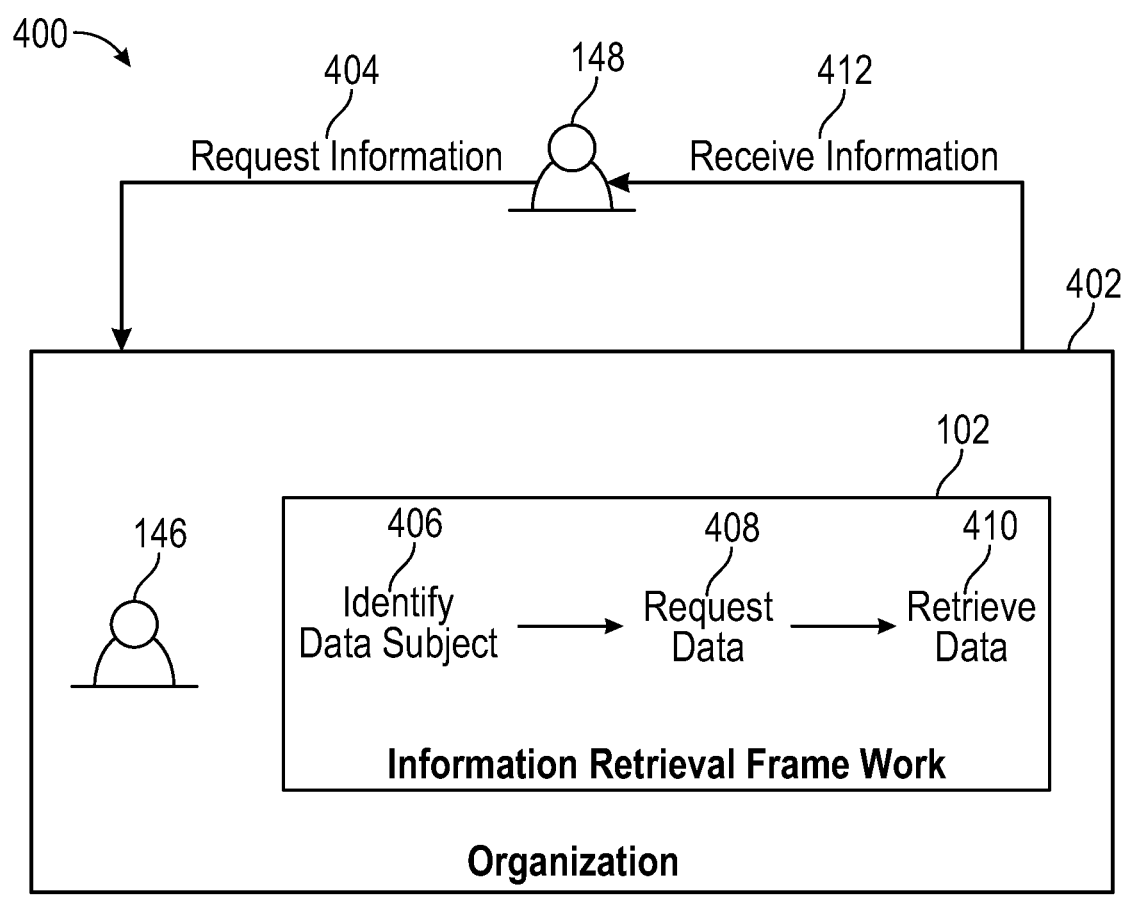
FIG. 4 depicts an exemplary process flow diagram relating to some embodiments.

Turning now to FIG. 4, an exemplary process flow 400 is depicted relating to some embodiments. In some embodiments, the process flow 400 may occur in association with one or more organizations, such as an organization 402, which may be a company or some other type of organization. In some embodiments, the data privacy and protection officer 146 may be belong to or be associated with said organization 402, as shown. Further, in some embodiments, the organization 402 may interface with the information retrieval framework 102. In some embodiments, an instance of the information retrieval framework 102 may be included within the organization 402. Alternatively, the information retrieval framework 102 may be included externally and communicatively coupled to the organization 402.

In some embodiments, the process flow 400 includes a step 404, in which a data subject 148 requests information from the organization 402. In some embodiments, the data subject 148 may request to view information relating to data category assignments or purpose assignments of the data subject's personal data. In some embodiments, the request may comprise any of an email communication, a phone call, or another communication mode. Accordingly, in some embodiments, the data protection and privacy officer 146 may be notified of the request. In one example, a data subject calls an organization requesting information on their personal data which is stored across various systems associated with the organization 402. Accordingly, in this example, the data subject may speak to a customer service representative of the organization 402 who notifies the data protection and privacy officer 146 of the information request.

In some embodiments, the data protection and privacy officer 146 may comprise any combination of a human user or an automated process. For example, in some embodiments, the data protection and privacy officer 146 may comprise an automated process which receives an information request and accesses the information retrieval framework 102 to retrieve an information report. In some embodiments, said automated processes may be at least partially monitored by a human user. At a step 406 the data subject 148 is identified within the information retrieval framework 102. In some embodiments, the data subject 148 may be identified using a user identifier which may be included within the request at step 404. At a step 408 a set of data is requested within the information retrieval framework 102. In some embodiments, the data may be requested in response to identifying the data subject 148.

At a step 410 the requested data is retrieved from the information retrieval framework 102. In some embodiments, the data may be retrieved in response to the data request at step 408 after the data subject 148 has been identified. At a step 412 the requested information is received by the data subject 148 from the organization 402. In some embodiments, the data retrieved at step 410 may be provided to the organization 402 from the information retrieval framework 102 which then provides the data or information associated with the data to the data subject 148. In some embodiments, the received information may be provided within a graphical user interface as part of a data report for the data subject 148. In some embodiments, an information report may be generated for the data subject 148 which comprises any of a PDF, TEXT, XML, or JSON format.

Figure 5A:
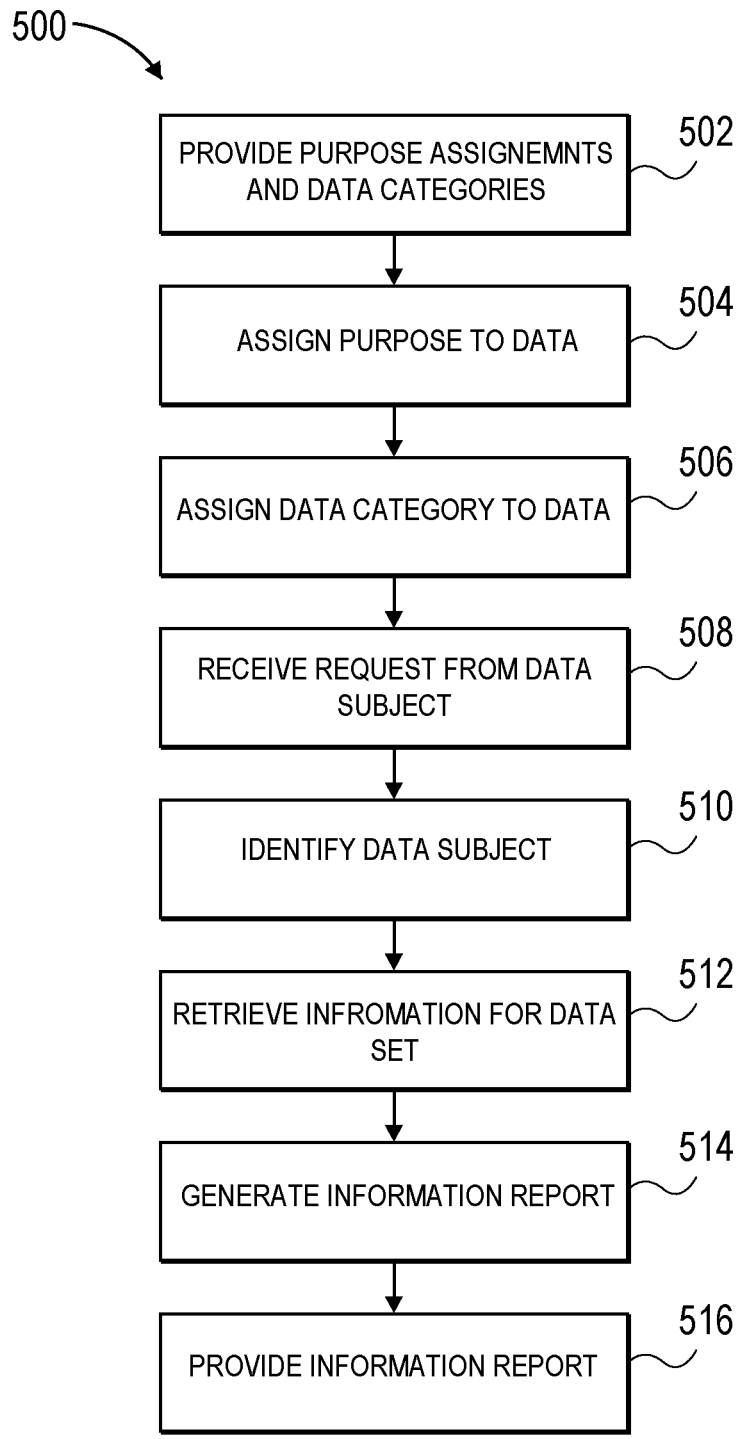
FIG. 5A depicts an exemplary method for purpose-based processing within an information retrieval framework relating to some embodiments.

Turning now to FIG. 5A, an exemplary method 500 for purpose-based processing of personal data is depicted relating to some embodiments. In some embodiments, the method 500 may be used to provide an information report to a data subject informing the data subject of how their personal data is to be processed and how their data is organized within the information retrieval framework 102. In some embodiments, the steps of the method 500 may be performed in any order. Further, embodiments are contemplated in which certain steps may be omitted.

At step 502 a plurality of purpose assignments and data categories may be provided within the information retrieval framework 102. Here, each purpose of the plurality of purpose assignments may define access to a respective set of personal data. Further, each data category of the plurality of data categories may define a grouping of personal data. At step 504 a purpose is assigned to a set of personal data belonging to a data subject. In some embodiments, the purpose may be assigned based on a preference of a user. Alternatively, or additionally, in some embodiments, the purpose may be assigned automatically based on one or more established purpose assignment rules. At step 506 a data category is assigned to the set of personal data. In some embodiments, the data categories may be defined automatically based on the content of the personal data. For example, one or more rules may be used to determine which data category should be assigned to a given set of personal data. In some embodiments, the data category may be assigned using any of a direct assignment, a derived assignment, or a complex API assignment, as described above. In some embodiments, more than one purpose may be assigned to a single set of personal data. Similarly, in some embodiments, a single set of personal data may correspond to more than one data category.

At step 508 a request is received from the data subject to review their personal data including the assignments of the personal data. In some embodiments, the request may be received as any of an email communication, a text message, or phone call. In some embodiments, the request may be submitted via an application running on a user device of the data subject or within a web browser. For example, the data subject may operate a data subject portal from within a web browser to submit the review request. In some embodiments, the request is submitted to the data controller or to some other entity. Further, in some embodiments, the request may be submitted to the data protection and privacy officer 146.

At step 510 the data subject is identified within the information retrieval framework 102. For example, in some embodiments, the data subject is identified based on a user identifier associated with the data subject. In some embodiments, the data subject is identified in response to receiving the request from the data subject. In some embodiments, the data subject may be further verified in addition to identifying the data subject. For example, in some embodiments, two-factor authentication may be used to verify the data subject's identity.

At step 512 a set of information is retrieved from the information retrieval framework 102. In some embodiments, the set of information is indicative of the assigned purpose and the assigned data category corresponding to the set of personal data. In some embodiments, additional information relating to the set of personal data is also retrieved from the information retrieval framework 102. At step 514 an information report is generated based on the retrieved information. Accordingly, the information report may comprise the information indicative of the assigned purpose and assigned data category. Further, in some embodiments, the information report includes the additional information relating to the set of personal data. At step 516 the information report is provided to the data subject. In some embodiments, the information report may be displayed within a graphical user interface on a user device of the data subject. In some embodiments, the information report is provided as a document which may be any of PDF, TEXT, XML, or JSON format.

Figure 5B:
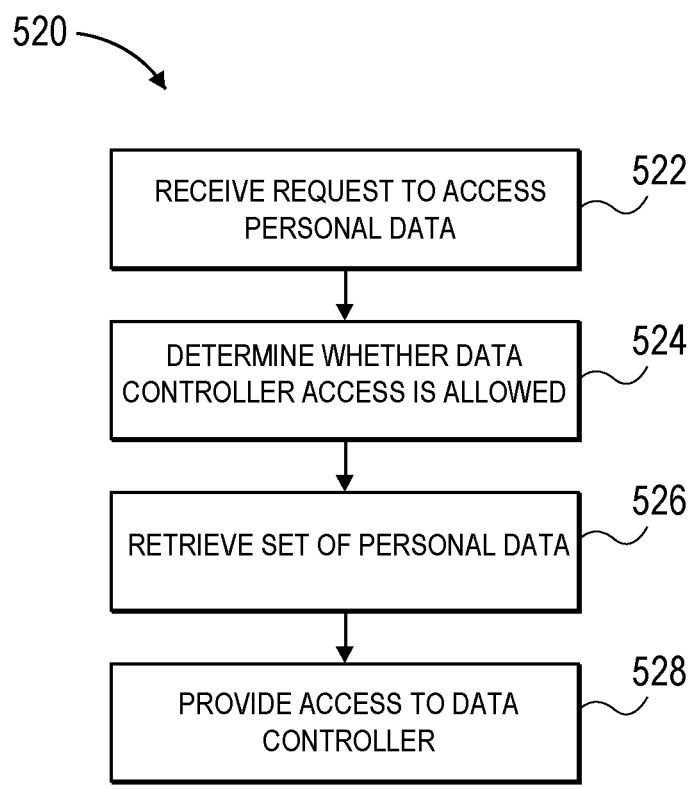
FIG. 5B depicts an exemplary method for managing access to personal data within an information retrieval framework relating to some embodiments.

Turning now to FIG. 5B, an exemplary method 520 for managing access to personal data on the information retrieval framework is depicted relating to some embodiments. At step 522 a request to access a set of personal data is received from a data controller. In some embodiments, the request may be submitted by the data controller to initiate processing of the personal data for a function of the data controller. For example, in some embodiments, the data controller may be an organization such as a vendor attempting to process a transaction of the data subject. Accordingly, the vendor must process transaction information of the data subject such as the data subjects bank account information in order to complete the transaction.

At step 524 it is determined whether the data controller is allowed to access and process the set of personal data based at least in part on a purpose assigned to the set of personal data. In some embodiments, this determination is based further on a data category assigned to the set of personal data. At step 526 the set of personal data is retrieved in response to determining that the data controller is allowed to access the set of personal data. Alternatively, if it is determined that the data controller is not allowed to access the set of personal data, then the access request may be denied, and the data controller is prevented from accessing the set of personal data. Accordingly, the personal data of the data subject is protected and is only processed for the correct reasons, as defined by the assigned purpose. In some embodiments, multiple purposes may be assigned to the same set of personal data such that the personal data may be processed for more than one reason.

At step 528 the data controller is provided access to process the set of personal data. In some embodiments, the data controller may be able to share the set of personal data with one or more other data controllers or processing entities according to assigned purpose. Accordingly, embodiments are contemplated in which two or more entities must process personal data to complete an operation. For example, to process a transaction, personal data may be processed by both a vendor and a banking entity.

Figure 6:
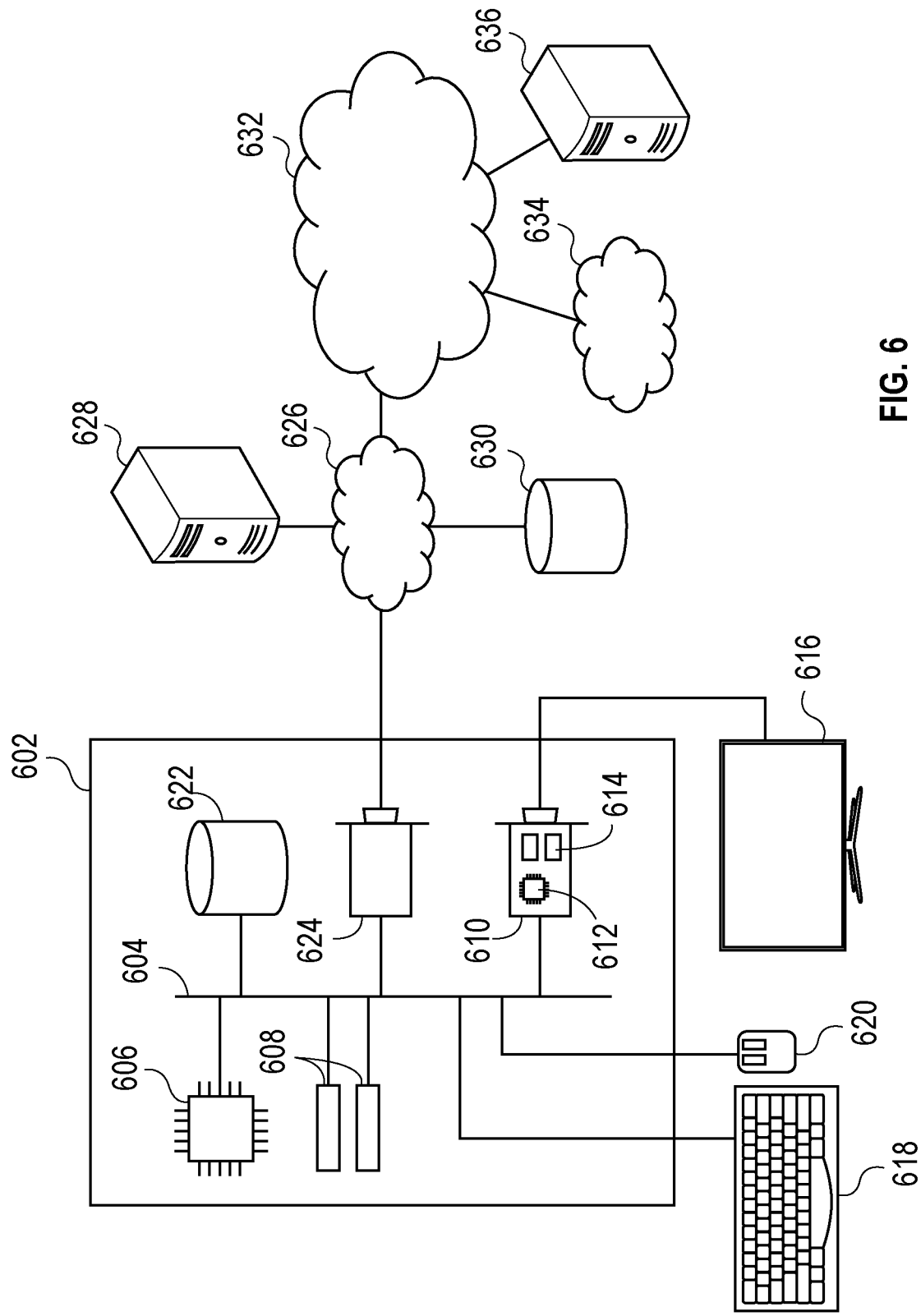
FIG. 6 depicts an exemplary hardware platform relating to some embodiments.

Turning now to FIG. 6, an exemplary hardware platform for certain embodiments is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, and may be internally installed in computer 602 or externally and removably attached.

Non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-executable instructions, data structures, program modules, and other data representations that may be executed or otherwise processed by a processor.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

Although the present teachings have been described with reference to the embodiments illustrated in the attached drawing figures, it is noted that equivalents may be employed and substitutions made herein without departing from the scope of the present teachings as recited in the claims.

Having thus described various embodiments, what is claimed as new and desired to be protected by Letters Patent includes the following:

1. One or more non-transitory computer-readable media storing computer-executable instructions that, when executed by a processor, perform a method for purpose-based processing of electronic data, the method comprising:

provising a plurality of purpose assignments and a plurality of data categories within an information retrieval framework, each purpose of the plurality of purpose assignments defining access to at least one set of electronic personal data, each set of electronic personal data belonging to a respective data subject of a plurality of data subjects, each data category of the plurality of data categories defining a grouping of electronic personal data;

assigning a purpose of the plurality of purpose assignments to an assigned set of electronic personal data belonging to a data subject of the plurality of data subject, the purpose identifying a goal of using the assigned set of electronic personal data and also identifying a plurality of data categories to which the goal applies;

through a computer-implemented electronic user interface, receiving a request from the data subject to review the assigned set of electronic personal data of the data subject;

in response to the request from the data subject, identifying the data subject within the information retrieval framework using at least one user identifier associated with the data subject;

retrieving a set of information from the information retrieval framework indicative of the assigned purpose and the assigned data category corresponding to the assigned set of electronic personal data;

generating a digital information report based on the retrieved information; and providing an electronic copy of the digital information report for reviewing the assigned purpose and the assigned data category of the assigned set of personal data.

2. The computer-readable media of claim 1, further comprising:

receiving, from a data controller, a request to access the set of personal data associated with the information retrieval framework;

determining whether the data controller is allowed to access the set of personal data based on an assigned purpose of the plurality of purpose assignments associated with the set of personal data;

in response to determining that the data controller is allowed to access the set of personal data, retrieving the set of personal data according to the assigned purpose; and providing access to the data controller to process the set of personal data.

3. The computer-readable media of claim 1, wherein the information retrieval framework interfaces with one or more remote cloud-based servers.

4. The computer-readable media of claim 1, wherein the plurality of data categories comprises one or more preconfigured data categories and one or more custom user-defined data categories.

5. The computer-readable media of claim 4, wherein each of the plurality of purpose assignments are custom user-defined purpose assignments.

6. The computer-readable media of claim 1, further comprising:

generating the information report for display within a graphical user interface on a user device of the data subject.

7. The computer-readable media of claim 1, wherein each data category of the plurality of data categories is associated with a respective sensitivity level indicative of a sensitivity of the corresponding set of personal data.

8. A method for purpose-based processing of personal data, the method comprising:

providing a plurality of purpose assignments and a plurality of data categories within an information retrieval framework, each purpose of the plurality of purpose assignments defining access to at least one set of electronic personal data, each set of electronic personal data belonging to a respective data subject of a plurality of data subjects, each data category of the plurality of data categories defining a grouping of electronic personal data;

assigning a purpose of the plurality of purpose assignments to an assigned set of electronic personal data belonging to a data subject of the plurality of data subject, the purpose identifying a goal of using the assigned set of electronic personal data and also identifying a plurality of data categories to which the goal applies;

through a computer-implemented electronic user interface, receiving a request from the data subject to review the assigned set of electronic personal data of the data subject;

in response to the request from the data subject, identifying the data subject within the information retrieval framework using at least one user identifier associated with the data subject;

retrieving a set of information from the information retrieval framework indicative of the assigned purpose and the assigned data category corresponding to the assigned set of electronic personal data;

generating a digital information report based on the retrieved information; and providing an electronic copy of the digital information report for reviewing the assigned purpose and the assigned data category of the assigned set of personal data.

9. The method of claim 8, wherein the plurality of data categories comprises one or more directly assigned data categories, one or more derived data categories assigned based on at least one run-time value, and one or more application programming interface (API) data categories assigned using an external API.

10. The method of claim 8, further comprising:
determining a storage lifecycle for the set of personal data based on the assigned data category.

11. The method of claim 8, further comprising:

receiving, from a data controller, a request to access the set of personal data associated with the information retrieval framework;

determining whether the data controller is allowed to access the set of personal data based on an assigned purpose of the plurality of purpose assignments associated with the set of personal data;

in response to determining that the data controller is allowed to access the set of personal data, retrieving the set of personal data according to the assigned purpose; and providing access to the data controller to process the set of personal data.

12. The method of claim 8, wherein the plurality of data categories includes a set of data categories relating to master data and a set of data categories relating to transactional data.

13. The method of claim 12, wherein each data category of the plurality of data categories is associated with a respective sensitivity level indicative of the sensitivity of the corresponding set of personal data.

14. The method of claim 12, further comprising:
assigning a sensitivity level to each data category of the plurality of data categories, the sensitivity level indicative of a sensitivity of the corresponding set of personal data.

15. A system for purpose-based processing of personal data, the system comprising:
one or more data stores; and
at least one processor programmed to perform a method for purpose-based processing of personal data, the method comprising:
providing a plurality of purpose assignments and a plurality of data categories within an information retrieval framework, each purpose of the plurality of purpose assignments defining access to at least one set of electronic personal data, each set of electronic personal data belonging to a respective data subject of a plurality of data subjects, each data category of the plurality of data categories defining a grouping of electronic personal data;
assigning a purpose of the plurality of purpose assignments to an assigned set of electronic personal data belonging to a data subject of the plurality of data subject, the purpose identifying a goal of using the assigned set of electronic personal data and also identifying a plurality of data categories to which the goal applies;
through a computer-implemented electronic user interface, receiving a request from the data subject to review the assigned set of electronic personal data of the data subject;
in response to the request from the data subject, identifying the data subject within the information retrieval framework using at least one user identifier associated with the data subject;
retrieving a set of information from the information retrieval framework indicative of the assigned purpose and the assigned data category corresponding to the assigned set of electronic personal data;
generating a digital information report based on the retrieved information; and
providing an electronic copy of the digital information report for reviewing the assigned purpose and the assigned data category of the assigned set of personal data.

16. The system of claim 15, further comprising:
providing the information report to the data subject for reviewing the assigned purpose and the assigned data category of the set of personal data.

17. The system of claim 16, further comprising:
generating the information report for display within a graphical user interface on a user device of the data subject.

18. The system of claim 17, further comprising:
receiving, from a data controller, a request to access the set of personal data associated with the information retrieval framework;
determining whether the data controller is allowed to access the set of personal data based on an assigned purpose of the plurality of purpose assignments associated with the set of personal data;
in response to determining that the data controller is allowed to access the set of personal data, retrieving the set of personal data according to the assigned purpose; and
providing access to the data controller to process the set of personal data.

19. The system of claim 15, wherein a storage lifecycle for the set of personal data is determined based on the assigned data category.

20. The system of claim 15, wherein the set of personal data corresponds to one or more data fields within a data table.

* * * * *